US010086949B2

(12) United States Patent
Karunakar et al.

(10) Patent No.: US 10,086,949 B2
(45) Date of Patent: Oct. 2, 2018

(54) SYSTEMS AND METHODS FOR SELECTIVE ANNUNCIATION

(71) Applicant: HONEYWELL INTERNATIONAL INC., Morris Plains, NJ (US)

(72) Inventors: Manjunatha Karunakar, Karnataka (IN); Aman Dubey, Karnataka (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/443,194

(22) Filed: Feb. 27, 2017

(65) Prior Publication Data

US 2018/0244399 A1    Aug. 30, 2018

(51) Int. Cl.
| | | |
|---|---|---|
| G08B 21/00 | (2006.01) | |
| B64D 45/00 | (2006.01) | |
| G06F 17/30 | (2006.01) | |

(52) U.S. Cl.
CPC ....... B64D 45/00 (2013.01); G06F 17/30761 (2013.01); G06F 17/30769 (2013.01)

(58) Field of Classification Search
CPC .............. B64D 45/00; G06F 17/30761; G06F 17/30769
USPC ........................................................ 340/945
See application file for complete search history.

(56) References Cited

U.S. PATENT DOCUMENTS

| | | | | |
|---|---|---|---|---|
| 3,582,949 A | * | 6/1971 | Forst .................... | G05D 1/0055 340/502 |
| 5,737,322 A | * | 4/1998 | Burbidge .............. | H04W 8/245 340/7.22 |
| 6,097,751 A | * | 8/2000 | Relph .................. | H04J 13/0022 370/312 |
| 6,448,907 B1 | | 9/2002 | Naclerio | |
| 6,646,566 B1 | * | 11/2003 | Tanguay ................. | G08B 3/10 340/384.1 |
| 6,963,743 B1 | * | 11/2005 | James .................. | H04B 1/3822 379/159 |
| 8,345,663 B2 | | 1/2013 | Brady, Jr. et al. | |
| 9,043,938 B1 | * | 5/2015 | Raghu ..................... | H04L 9/085 713/183 |
| 2002/0129354 A1 | * | 9/2002 | Bryan ................. | H04L 12/1895 717/176 |
| 2003/0048203 A1 | * | 3/2003 | Clary ..................... | G01C 23/00 340/945 |
| 2003/0146853 A1 | * | 8/2003 | Bolduc .................. | B64D 43/00 340/974 |
| 2004/0054481 A1 | | 3/2004 | Lovett | |
| 2004/0257246 A1 | * | 12/2004 | Pahl ...................... | B64C 1/1469 340/945 |

(Continued)

FOREIGN PATENT DOCUMENTS

DE      102009006153 A1     7/2010

*Primary Examiner* — Kerri McNally
*Assistant Examiner* — Thang Tran
(74) *Attorney, Agent, or Firm* — Lorenz & Kopf, LLP

(57) ABSTRACT

A system and method are provided that are capable of processing incoming status data from a variety of sources to identify an event therein. The identified event is then processed with a rules engine to determine an intended or authorized recipient for the event, wherein the intended recipient is one or a plurality of potential recipients. A communication protocol is then determined that is based on an annunciation device uniquely associated with the intended recipient. The event is then selectively annunciated to the authorized, intended recipient.

19 Claims, 2 Drawing Sheets

(56) References Cited

U.S. PATENT DOCUMENTS

| | | | | |
|---|---|---|---|---|
| 2005/0025181 A1* | 2/2005 | Nazari | ............... | H04W 48/08 |
| | | | | 370/469 |
| 2006/0046715 A1* | 3/2006 | Burgemeister | ....... | G08G 5/0013 |
| | | | | 455/431 |
| 2007/0100757 A1* | 5/2007 | Rhoads | ................ | G06F 21/10 |
| | | | | 705/51 |
| 2008/0104642 A1 | 5/2008 | Galipeau et al. | | |
| 2008/0310609 A1* | 12/2008 | Brady, Jr. | ............. | H04M 9/001 |
| | | | | 379/167.02 |
| 2009/0112378 A1* | 4/2009 | Robb | ............... | B64D 11/0015 |
| | | | | 701/3 |
| 2010/0238911 A1* | 9/2010 | Michalson | .......... | H04L 27/2601 |
| | | | | 370/338 |
| 2010/0292912 A1* | 11/2010 | Palanichamy | ....... | G08G 5/0013 |
| | | | | 701/120 |
| 2011/0282718 A1* | 11/2011 | Hatami | ................ | G01C 21/20 |
| | | | | 705/14.1 |
| 2012/0122428 A1* | 5/2012 | Stephens, Jr. | ......... | H04W 4/003 |
| | | | | 455/412.2 |
| 2012/0150968 A1* | 6/2012 | Yasrebi | ................ | H04L 51/24 |
| | | | | 709/206 |
| 2015/0045989 A1* | 2/2015 | Polansky | ............... | B64D 45/00 |
| | | | | 701/2 |
| 2015/0111591 A1* | 4/2015 | Hoffberg | ............ | G06Q 10/0631 |
| | | | | 455/452.1 |
| 2016/0044568 A1* | 2/2016 | White | ................ | H04W 36/30 |
| | | | | 370/332 |
| 2017/0213043 A1* | 7/2017 | Rajnak | ................ | G06F 21/606 |

* cited by examiner

SYSTEMS AND METHODS FOR SELECTIVE ANNUNCIATION

TECHNICAL FIELD

The technical field generally relates to notification systems, and more particularly relates to systems and related operating methods for selective annunciation of an event.

BACKGROUND

People are generally familiar with notification systems that employ a variety of annunciation devices. As used herein, annunciate means to announce. Annunciation, therefore, may be performed through auditory, visual, or any other form of communication. Events are announced with an annunciation device, and examples of common events that are annunciated include the arrival of a voice message, annunciated on a mobile phone, and the ending of a school day, annunciated via an audio speaker. As may be appreciated from these examples, the nature of each event may dictate one or more target recipients (i.e., in the voice message example, the target recipient may be a singular owner of the mobile phone, and in the end of the school day example, the target recipients may be a group of individuals within an emission range of the audio speaker).

In the context of a predefined area, such as an aircraft cabin, conventional systems, such as an in-flight entertainment system (IFE) and a cabin management system (CMS), often utilize an annunciation system that may be seen and/or heard by everyone in the aircraft cabin. Providing event information to all people in the predefined area is suitable for information that is for general consumption. However, technological problems remain, including distinguishing and managing scenarios in which it is desirable that event information to be selectively and discretely distributed to an intended recipient. Providing event information to only authorized, intended recipients(s) is referred to herein as selective annunciation of events.

Accordingly, systems and methods capable of processing event information, determining intended recipient(s) for the event information, and selectively annunciating the event to the intended recipient(s) are desirable. The following disclosure provides a technological solution to this technological problem, as well as addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system for selective annunciation of an event is provided. The system comprises: a plurality of annunciation devices; a database of communication protocol rules; a database of information rules; and a processor coupled to the plurality of annunciation devices, the database of communication protocol rules and the database of information rules, the processor configured to, receive status data from one or more status data sources; identify an event data among the status data; identify an intended recipient based on information rules associated with the event data; and process the intended recipient and the communication protocol rules to determine a target annunciation device associated with the event data, wherein the target annunciation device is one of the plurality of annunciation devices.

Another system for selective annunciation of an event is provided. The system comprises: a plurality of annunciation devices; a first database of communication protocol rules; a second database of information rules; and a processor coupled to the plurality of annunciation devices, the first database and the second database, the processor configured to: receive status data from one or more status data sources; identify an event data among the status data; identify an intended recipient based on information rules associated with the event data; process the intended recipient and the communication protocol rules to determine a target annunciation device associated with the event data, wherein the target annunciation device is one of the plurality of annunciation devices; and command the target annunciation device to annunciate an event associated with the event data while inhibiting a remainder of annunciation devices from annunciating the event.

Also provided is a method for an annunciation system, the method comprises: assessing and storing a plurality of available annunciation devices; receiving, continuously, status data from a flight management system (FMS); identifying an event data from among the status data; processing, in a rules engine, the event data, to identify an intended recipient associated with the event data; processing, in the rules engine, the intended recipient to determine a target annunciation device associated with the event data, wherein the target annunciation device is one of the plurality of available annunciation devices; and commanding the target annunciation device to annunciate an event associated with the event data while inhibiting a remainder of annunciation devices from annunciating the event.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided selective annunciation system and method may take the form of a selective annunciation module (hereinafter simplified to "annunciation module"), and may be separate from, or integrated within, a preexisting mobile platform management system, cabin management system (CMS), or aircraft flight management system (FMS).

Figure 1:
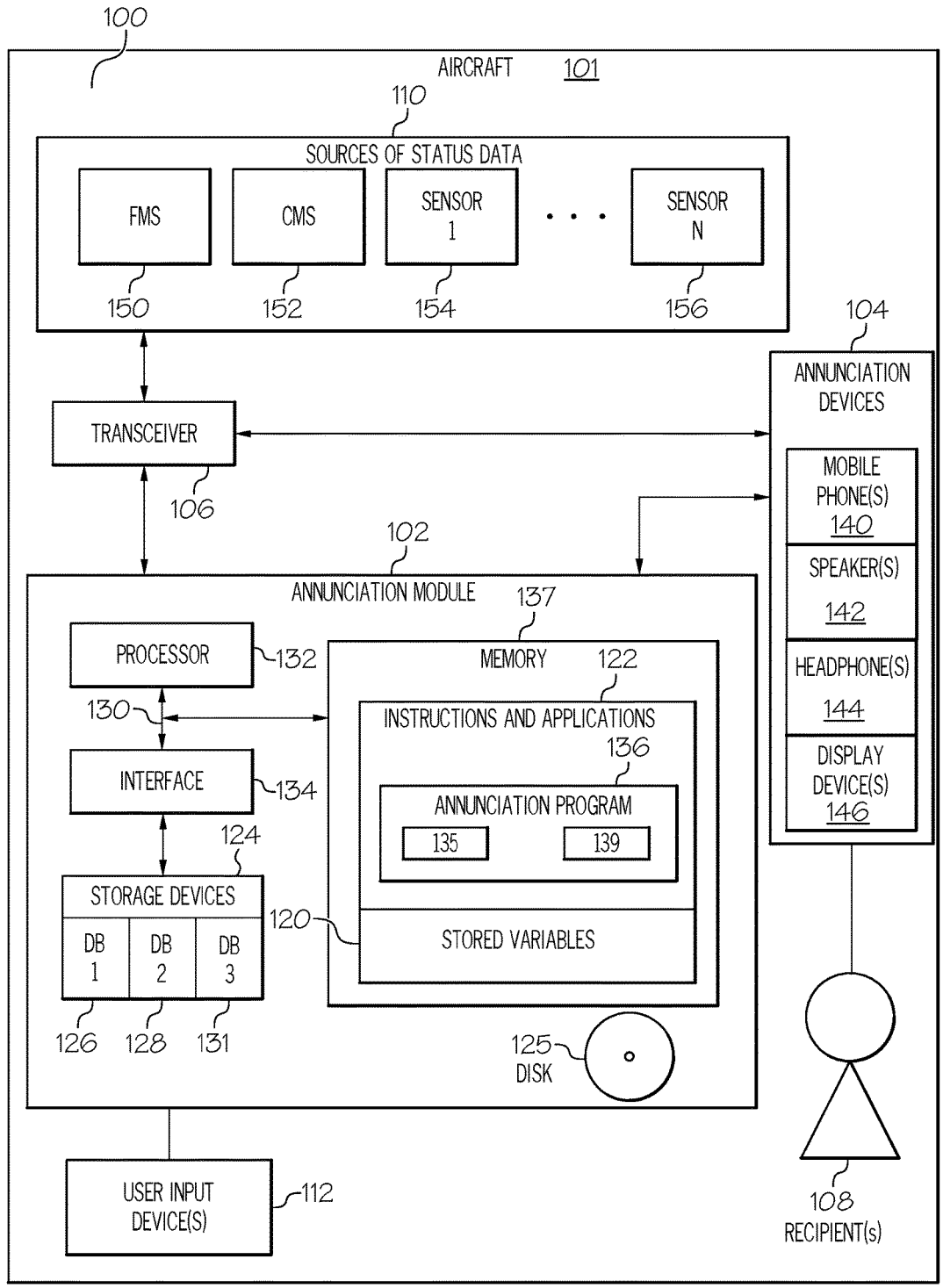
FIG. 1 is a functional block diagram illustrating a selective annunciation system, in accordance with various exemplary embodiments.

Turning now to FIG. 1, a functional block diagram of a selective annunciation system (hereinafter simplified to "annunciation system") 100 is depicted, in accordance with various exemplary embodiments. Although the depicted embodiment realizes the selective annunciation system 100 within a cabin of an aircraft 101, the concepts presented here can be deployed in a variety of mobile and non-mobile platforms, such as vehicles, spacecraft, watercraft, buildings, open-air spaces, and the like.

In the depicted embodiment, the selective annunciation system 100 includes: an annunciation module 102 that receives status data from a plurality of sources 110 of status data, via transceiver 106. In the embodiment depicted in FIG. 1, the sources 110 of status data include a flight management system (FMS) 150, a cabin management system (CMS) 152, and a third number (N) of sensors, depicted by first sensor 154, and sensor N 156. The annunciation module 102 is electronically coupled to a first number (A) of annunciation devices 104. A plurality of recipients (R) 108 are associated with the A annunciation devices 104. A user input device 112 may also electronically coupled to the annunciation module 102. The operation of these functional blocks and a relationship between A and R is described in more detail below.

The sources 110 of status data provide the data to be processed and transformed to determine event data. The FMS 150 may provide, a flight plan, including intermediate waypoints; Flight Information (Airspeed, Ground Speed, Wind Speed, Wind Direction, Altitude, Latitude, Longitude, Outside Air Temperature, Time to Destination, Distance to Destination, GMT, Estimated Time of Arrival, etc.); and Aircraft Navigation & Guidance information (turning, rolling data). The CMS 152 may provide a variety of internal climate controls and entertainment system controls.

Another source 110 of status data is the N sensors. Sensors provide status data regarding a component or subsystem of the aircraft 101. Generally, each sensor of the N sensors is specifically coupled to a component or subsystem of the aircraft 101 and configured to sense a specific aspect of the component or subsystem, and convert sensed information into status data. For example, the N sensors may include sensors, devices, instruments, and software, sufficient for detecting (sensing) a subsystem or component status, and converting the sensed information into electronic information for use by the annunciation module 102. The N sensors may also provide data to the FMS 150 and the CMS 152.

Examples of subsystems and components that the sensors may be coupled to include spoilers, speed brakes, engine temperature, cabin temperature, cabin pressure, and the like. Accordingly, in various embodiments, the sensor status data provided about the components and subsystems that are sensed includes: electrical, pressure, and/or mechanical connection of the components and subsystems, temperature, vibration, and velocity. As a non-limiting example, the status data provided to the annunciation module 102 from the N sensors may include velocity and acceleration information, wheel rotation, breaking gravitational (G) force, inclines and declines during travel, pressure on a gas pedal and a brake, gear status, external temperature, battery status information, sensed cabin temperature. In addition to the sensors that sense subsystems and components, the N sensors may also include sensors, devices, instruments (such as radar, Lidar, and a global positioning system (GPS)), and software, for providing an aircraft position, location, and orientation, in addition to detecting weather, and providing a predicted position, location, orientation, etc., with respect to an aircraft and its flight path, for weather events such as turbulence, to the annunciation module 102.

To further illustrate what is meant by an event to be annunciated, consider the following four examples: the first example event is an issue with an engine; the second example event is that the cabin temperature has become too cold; the third example event is that turbulence is predicted within a predetermined distance in front of the aircraft along its flight path; and, the fourth example event is a change in flight path. The four examples are non-limiting; multiple other events are supported by the herein described annunciation module 102. As may be readily appreciated based on these examples, the event may be considered the occurrence of a change in a status of something that is being measured or monitored; therefore, as used herein, an event (and associated event data) is based on status data and on variations thereof. The annunciation module 102 continually receives the status data, which, at any given time, may be from any combination of the variety of sources 110 of status data. The annunciation module 102 identifies an event based thereon. Accordingly, a technological challenge addressed by the annunciation module 102 is the identification of event data from among the received status data.

Having determined an event from the received status data, another technological challenge addressed by the annunciation module 102 is the determination of one or more authorized, intended recipient(s) 108 for the event. After the authorized intended recipient 108 for the event is determined, another technological challenge is to determine one or more annunciation device(s) 104, out of the A annunciation device(s) 104, that is associated with the intended recipient 108. Related to the determination of the annunciation device(s) 104 for the event data is the determination of the communication protocol to use based on what is supported by the respective annunciation device 104. Each of the above described determinations is performed in accordance with the annunciation program 136, as will be described in more detail below.

As depicted in FIG. 1, the A annunciation device(s) 104 may comprise any one, or combination, of: personal electronic devices, such as mobile phones 140, audio speakers 142, headphones 144, and display devices 146. The display device(s) 146 may be implemented using any one of numerous known display devices suitable for rendering textual, graphic, and/or iconic information in a format viewable by a user. Non-limiting examples of such display devices include cathode ray tube (CRT) displays, and flat panel displays such as LCD (liquid crystal displays) and TFT (thin film transistor) displays. Accordingly, each annunciation device has a communication protocol that is audio, text, or visual symbology, and as such, each annunciation device annunciates and ceases annunciation of (i) emitted speech or sounds, or (ii) rendered symbology or alphanumeric information. The various annunciation devices 104 may each, individually, be responsive to user input via user input device 112 and/or be under the control of the annunciation module 102.

As mentioned, a plurality of recipients (R) 108 is associated with the A annunciation devices 104. A non-limiting example embodiment is presented to assist understanding. In the example embodiment, R comprises a pilot, a crew member and multiple passengers. Consider the following example. R equals 7: a pilot, a crew member, and 5 passengers. A equals three: a headphone worn by the pilot, a cell phone carried by the crew member, and an audio speaker sufficient to project an annunciation that the pilot, the crew member and the five passengers can hear (i.e., all 7 recipients). For any given event, it is desirable to annunciate the event to one or more of (i) only the pilot, (ii) only the crew member, or (iii) all recipients. In the context of the example events provided above, the first example event (an issue with an engine), is desirable to annunciate to only the pilot (via the pilot's headphone 144). The second example event (the cabin temperature being too cold) is desirable to annunciate to only the crew member (via the crew member's mobile phone 140) so that the crew member may remedy the temperature setting without disturbing the pilot or the passengers. The third example event (that turbulence is predicted) is desirable to annunciate to all seven recipients (via the audio speaker 142). The fourth example event (a change in flight path) is desirable to annunciate to the pilot (via the pilot's headphone 144) and the crew member (via the crew member's mobile phone 140), but not to the passengers.

In reviewing the above examples, a relationship, or association, between A and R may be described as follows. R is two or greater. A is also two or greater, and A varies in accordance with the application, i.e., A may be smaller than, equal to, or larger than, R. This relationship provides a technological solution that transcends a single annunciation device 104 annunciating to all R recipients 108, and applies rules to select among available recipients 108 and then further transforms data to an appropriate communication protocol to command an identified target annunciation device 104.

In various embodiments, the user input device 112 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. Non-limiting examples of uses for the user input device 112 include: entering values for stored variables 120, loading or updating instructions and applications 122, and loading and updating the contents of the storage devices 124, each described in more detail below.

The transceiver 106 may include at least one receiver and at least one transmitter that are operatively coupled to the annunciation module 102. The transceiver 106 can enable the annunciation module 102 to establish and maintain the communications links to onboard components (not shown), the sources 110 of status data, and the annunciation devices 104. The transceiver 106 can support wired and a variety of types of wireless communication, and can perform signal processing (e.g., digitizing, data encoding, modulation, etc.) as is known in the art. In some embodiments, the transceiver 106 is integrated with the annunciation module 102.

The annunciation module 102 performs the functions of the annunciation system 100. With continued reference to FIG. 1, within the annunciation module 102, the processor 132 and the memory 137 form a processing unit that performs the processing activities, providing a technological improvement of selective annunciation to the technological problem of annunciating event information. With focus on the processing unit, a technological improvement is realized, in part, by a rules engine, wherein the processor 132 executes rules from program 135, and a voice engine, wherein the processor 132 executes rules from program 139 (the program 135 and program 139 are collectively referred to as the annunciation program 136).

The annunciation module 102 also includes an interface 134, communicatively coupled to the processor 132 and memory 137 (via a bus 130), storage device(s) 124, and an optional storage disk 125. In various embodiments, the annunciation module 102 performs actions and other functions in accordance with steps of the method 200 described in connection with FIG. 2. The processor 132 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

A computer readable storage medium, such as a memory 137, the storage device(s) 124, or a disk 125 may be utilized as both storage and a scratch pad. The memory locations where data bits are maintained are physical locations that have particular electrical, magnetic, optical, or organic properties corresponding to the data bits. The memory 137 can be any type of suitable computer readable storage medium. For example, the memory 137 may include various types of dynamic random access memory (DRAM) such as SDRAM, the various types of static RAM (SRAM), and the various types of non-volatile memory (PROM, EPROM, and flash). In certain examples, the memory 137 is located on and/or co-located on the same computer chip as the processor 132. In the depicted embodiment, the memory 137 stores the above-referenced instructions and applications 122 along with one or more configurable variables in stored variables 120.

The storage device(s) 124 are computer readable storage mediums in the form of any suitable type of storage apparatus, including direct access storage devices such as hard disk drives, flash systems, floppy disk drives and optical disk drives. In one exemplary embodiment, the storage device(s) 124 comprises a first data base 126, that stores a lookup table that associates the annunciation devices 104 (such as a cellular phone) with a type of communication that the annunciation device 104 supports (such as audio or a visual display of symbols and/or alphanumeric information), and one or more recipient(s) 108. In the embodiment, a second database 128 comprises a lookup table that associates prerecorded audio messages with specific identified events. A third database 131 stores an authorization table, i.e., a lookup table of recipients associated with types of information that they should receive. In one example embodiment, the third database 131 lookup table associates people by their title with the information that they should receive (for example, a pilot with a change in engine status, or a crew member with a cabin temperature change). In another example embodiment, the third database 131 lookup table associates people by their names with the information that they should receive. Information in the databases 126, 128, and 131 may be organized or imported during an initialization step (at 202 of the method 200 in FIG. 2).

The bus 130 serves to transmit programs, data, status and other information or signals between the various components of the annunciation module 102. The bus 130 can be any suitable physical or logical means of connecting computer systems and components. This includes, but is not limited to, direct hard-wired connections, fiber optics, infrared and wireless bus technologies. During operation, the annunciation rules and program 136, stored in the memory 137, is loaded and executed by the processor 132.

The interface 134 enables communication within annunciation module 102, for example from a system driver and/or another computer system, and can be implemented using any suitable method and apparatus. In one embodiment, the interface 134 obtains the various data from the transceiver 106 and/or from the annunciation devices 104 directly. The interface 134 can include one or more network interfaces to communicate with other systems or components. The interface 134 may also include one or more network interfaces to communicate with technicians, and/or one or more storage interfaces to connect to storage apparatuses, such as the storage device(s) 124.

During operation, the processor 132 loads and executes one or more programs, algorithms and rules embodied as instructions and applications 122 contained within the memory 137 and, as such, controls the general operation of the annunciation module 102 as well as the annunciation system 100. In executing the process described herein, such as the method 200 of FIG. 2, the processor 132 loads and specifically executes the annunciation program 136, to thereby realize an unconventional technological improvement to the technological problem of selective annunciation of event information. Additionally, the processor 132 is configured to process received inputs (any combination of the user input provided via user input device 112, and status data from one or more of the sources 110 of status data), reference the storage devices 124 in accordance with the annunciation program 136, and command and control the annunciation devices 104 based thereon.

Figure 2:
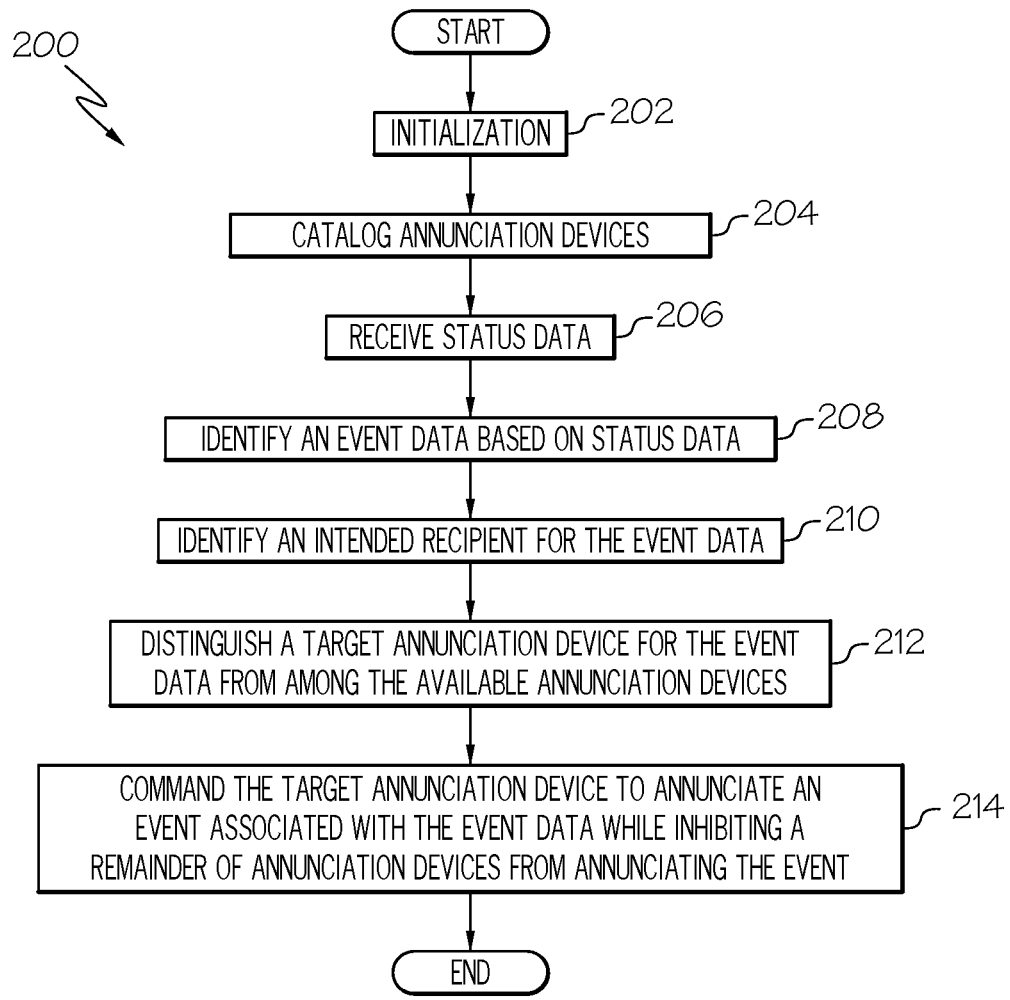
FIG. 2 is a flow chart describing a method for a selective annunciation system, in accordance with various exemplary embodiments.

A method 200 for selective annunciation is provided in connection with FIG. 2. The processor 132 and an information rules program 135 form a rules engine that continually identifies (i) event data from among the received status data, (ii) an intended recipient 108 from among a plurality of available recipients 108, based on the event data and rules stored in the third database 131, and (iii) at least one target annunciation device 104 associated with the event data based on the intended recipient. Depending upon rules stored in a communication protocol database (the first database 126), a variety of communication protocols may be used to command the respective target annunciation device 104. Moreover, a pre-recorded voice message may be appropriate for the identified event; in this case, the processor 132 and a voice program 139 form a voice engine that pulls prerecorded messages from the second database 128 and commands the target audio device 104 to emit the prerecorded voice message. In an alternative, an annunciated audio voice message may be dynamically generated by a voice synthesizer that is integrated within a target audio device 104, and commanded in accordance with the respective communication protocol.

It will be appreciated that annunciation system 100 may differ from the embodiment depicted in FIG. 1. As a first example, in various embodiments, any combination of the user input device 112, the transceiver 106, the sources 110 of status data can be part of an existing CMS 152 or FMS 150. Regardless of the state of integration of these systems, a user may control one or more features of the systems onboard the selective annunciation system 100 by providing user input via at least the user input device 112.

Referring now to FIG. 2 and with continued reference to FIG. 1, a flow chart is provided for a method 200 for an annunciation system 100, in accordance with various exemplary embodiments. Method 200 represents various embodiments of a method associated with the annunciation system 100. For illustrative purposes, the following description of method 200 may refer to elements mentioned above in connection with FIG. 1. In practice, portions of method 200 may be performed by different components of the described system. It should be appreciated that method 200 may include any number of additional or alternative tasks, the tasks shown in FIG. 2 need not be performed in the illustrated order, and method 200 may be incorporated into a more comprehensive procedure or method having additional functionality not described in detail herein. Moreover, one or more of the tasks shown in FIG. 2 could be omitted from an embodiment of the method 200 as long as the intended overall functionality remains intact.

The method starts, and at 202 the annunciation module 102 is initialized. As mentioned above, initialization may comprise uploading or updating instructions and applications 122, annunciation rules and program 136, stored variables 120, and the various lookup tables stored in the storage devices 124. Predetermined variables include, for example, predetermined distances from the aircraft for which detected turbulence is to be annunciated. At 204, the available annunciation devices 104 are assessed and catalogued in the memory 137 and the storage devices 124. At 204, therefore, each available annunciation device is stored in memory 137, and the method 200 determines, for each annunciation device 104, one or more communication protocols that the annunciation device 104 supports. Additionally, based on user input, or rules within the annunciation program 136, the method 200 associates the annunciation device 104 with one or more recipient(s) 108.

At 206, status data is received. As described above, the status data may be continually received from various sources 110 of status data, such as FMS 150, CMS 152, and any of N sensors (154, 156). At 208, the status data is processed to identify therein a portion of data referred to as event data. Event data comprises the relevant information to annunciate an associated event. At 210, the identified event data is used to search the third database 131 and the rules determine an (authorized) intended recipient 108 that shall receive the annunciation of the event.

At 212 the communication protocol database, stored in the first database 126, is referenced to determine a target annunciation device 104 associated with the intended recipient 108, and further, what communication protocol should be used to annunciate the event to the intended recipient 108 on the target annunciation device 104. As mentioned, the selected communication protocol (and/or identified event) may further dictate the use of a prerecorded message stored in the second database 128.

At 214, the target annunciation device 104 is commanded to annunciate the identified event in the communication protocol determined, while inhibiting a remainder of annunciation devices from annunciating the event. The remainder of annunciation devices 104 is understood to be every available annunciation device 104 that was not determined to be an intended recipient 108.

Depending upon the application, after completion of 214 the process may return to 206 for continued receipt of status data, or end. Thus, a system and method capable of processing event information, determining authorized recipients for the event information, and selectively annunciating the event to the authorized recipients are provided.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims. It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 136 and containing computer instructions stored therein for causing a computer processor (such as the processor 132) to perform and execute the program 136. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

What is claimed is:

1. A system for selective annunciation of an event, the system comprising:
   a plurality of annunciation devices;
   a database of communication protocol rules;
   a database of information rules; and
   a processor coupled to the plurality of annunciation devices, the database of communication protocol rules and the database of information rules, the processor configured to
   associate each annunciation device of the plurality of annunciation devices with one or more recipients;
   receive status data from multiple status data sources;
   identify an event data among the status data;

identify an intended recipient based on information rules associated with the event data; and determine, from among annunciation devices associated with the intended recipient, a target annunciation device based on the identified event and the communication protocol rules.

2. The system of claim 1, wherein the processor is further configured to command the target annunciation device to annunciate an event associated with the event data while inhibiting a remainder of annunciation devices from annunciating the event.

3. The system of claim 2, wherein the processor is further configured to:

determine a communication protocol for the target annunciation device; and command the target annunciation device to annunciate the event in accordance with the communication protocol.

4. The system of claim 3, wherein the status data sources comprise a flight management system (FMS) and a cabin management system (CMS).

5. The system of claim 4, wherein the processor is further configured to:

process the event data to determine a pre-recorded voice message associated with the identified event; and command the target annunciation device to annunciate the pre-recorded voice message.

6. The system of claim 5, wherein the processor is further configured to:

identify a second intended recipient based on the information rules associated with the event data;

identify which annunciation devices, from the plurality of annunciation devices, are associated with the second intended recipient; and determine, from among annunciation devices associated with the second intended recipient, a second target annunciation device based on the identified event, the second target annunciation device being different from the first target annunciation device, and being based on the identified event and the communication protocol rules.

7. The system of claim 6, wherein the processor is further configured to command the target annunciation device and the second target annunciation device to annunciate the event while inhibiting a remainder of annunciation devices from annunciating the event.

8. The system of claim 7, wherein the processor is further configured to:

determine a communication protocol for the second target annunciation device; and command the second target annunciation device to annunciate the event in accordance with the communication protocol of the second target annunciation device.

9. The system of claim 8, wherein the target annunciation device is one from the set including, a personal electronic device, a headphone, a speaker, and a display device.

10. The system of claim 9, wherein the second target annunciation device is one from the set including, a personal electronic device, a headphone, a speaker, and a display device.

11. A system for selective annunciation of an event, the system comprising:

a plurality of annunciation devices;
a first database of communication protocol rules;
a second database of information rules; and a processor coupled to the plurality of annunciation devices, the first database and the second database, the processor configured to associate each annunciation device of the plurality of annunciation devices with one or more recipients;

receive status data from a flight management system (FMS) and a cabin management system (CMS);

identify an event data among the status data;

identify an intended recipient for the event data based on information rules associated with the event data;

determine, from among annunciation devices associated with the intended recipient, a target annunciation device based on the identified event and the communication protocol rules; and command the target annunciation device to annunciate an event associated with the event data while inhibiting a remainder of annunciation devices from annunciating the event.

12. The system of claim 11, wherein the processor is further configured to:

determine a pre-recorded voice message associated with the identified event, based on the communication rules; and command the target annunciation device to annunciate the pre-recorded voice message.

13. A method for an annunciation system, the method comprising:

assessing and storing a plurality of available annunciation devices in communication with a processor;

associating each annunciation device of the plurality of annunciation devices with one or more recipients;

receiving, continuously, status data from a flight management system (FMS);

identifying an event data from among the status data;

processing, in a rules engine, the event data, to identify an intended recipient associated with the event data;

determining, from among annunciation devices associated with the intended recipient, a target annunciation device based on processing, in the rules engine, the intended recipient and the communication protocol rules; and commanding the target annunciation device to annunciate an event associated with the event data while inhibiting a remainder of annunciation devices from annunciating the event.

14. The method of claim 13, further comprising, determining a communication protocol for the target annunciation device; and commanding the target annunciation device to annunciate the event in accordance with the communication protocol.

15. The method of claim 14, further comprising, receiving, continuously, status data from a sensor or a cabin management system (CMS).

16. The method of claim 15, further comprising:

determining, by the rules engine, that a pre-recorded voice message is associated with the identified event; and commanding, by a voice engine, the target annunciation device to annunciate the pre-recorded voice message.

17. The method of claim 16, further comprising:

identifying a second intended recipient based on information rules associated with the event data; and determining, from among annunciation devices associated with the second intended recipient, a target annunciation device based on the identified event based on processing the second intended recipient and communication protocol rules, wherein the second target annunciation device is one of the plurality of annunciation devices, and is different from the target annunciation device.

18. The method of claim 17, further comprising, commanding the target annunciation device and the second target annunciation device to annunciate the event in accordance with their respective communication protocols, while inhibiting a remainder of annunciation devices from annunciating the event.

19. The method of claim 18, wherein the communication protocol of the target device is audio and the communication protocol of the second target device is visual.

* * * * *